Aug. 1, 1972  E. F. WOOD  3,681,161
PROCESS FOR BONDING CYLINDRICALLY-SHAPED ARTICLES
Filed June 23, 1969
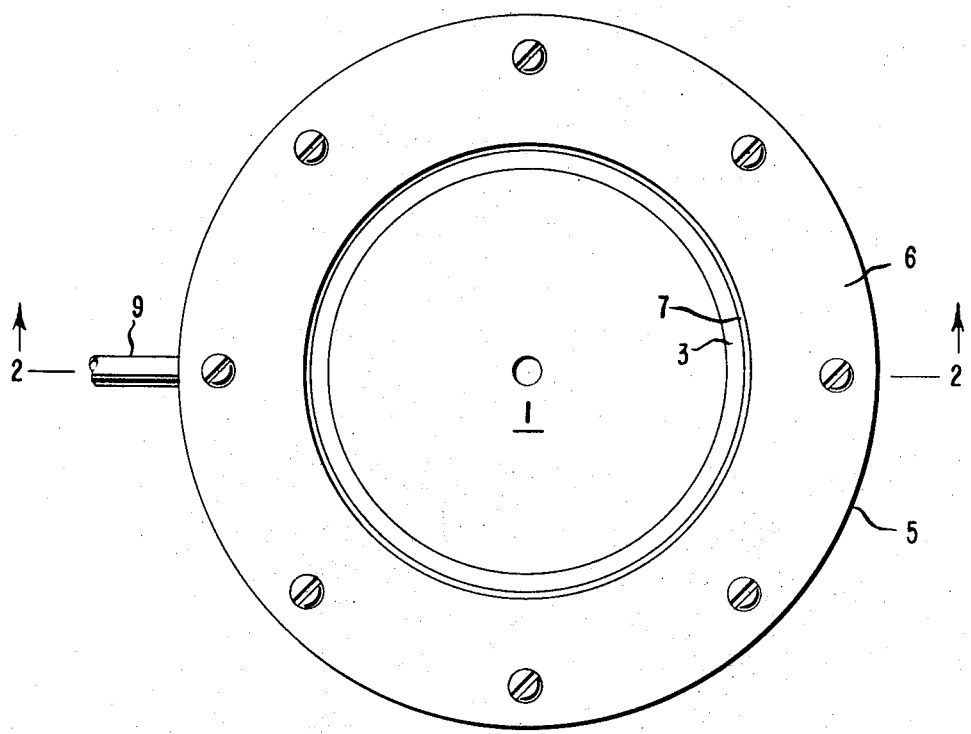
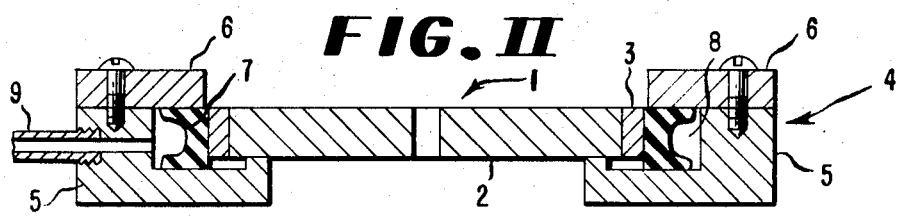
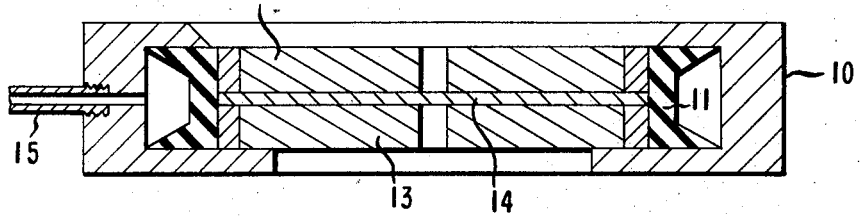
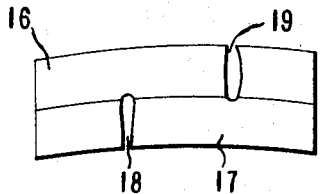
INVENTOR
EVERITT F. WOOD
BY *Frank C. Hilberg, Jr.*
ATTORNEY

United States Patent Office 3,681,161
Patented Aug. 1, 1972

3,681,161
PROCESS FOR BONDING CYLINDRICALLY-SHAPED ARTICLES
Everitt Franklin Wood, West Chester, Pa., assignor to E. I. du Pont de Nemours and Company, Wilmington, Del.
Filed June 23, 1969, Ser. No. 835,392
Int. Cl. B29c 17/00
U.S. Cl. 156—285   2 Claims

ABSTRACT OF THE DISCLOSURE

An annular gluing clamp having an annular inwardly facing pressure chamber the inner wall of which is defined by a flanged elastomeric ring and a process of assembling rim core grinding wheels and similar glued rim core, by inserting a curable adhesive between the rim and core, mounting the rim and core in the clamp, pressuring the clamp and curing the adhesive.

BACKGROUND OF THE INVENTION

This invention relates to a clamp for positioning holding, and applying pressure to the exterior surface of a rim positioned with a close fit around a core covered by an adhesive, generally requiring externally applied pressure during cure and more particularly to a clamp for mounting abrasive containing rims on cores to manufacture grinding wheels.

In the past peripheral abrasive wheels consisting of a resin bonded rim and a metal core have suffered from rim stripping due to inadequate bond strength between the rim and the core. Such stripping leads to waste of the diamond abrasive. In the past various methods have been used to attach abrasive rims to cores. Several different high temperature liquid adhesives were employed by coating the edge surface of the core with the uncured adhesive, and placing the rim around the adhesive. The rims were either just large enough to slip over the core when cold or were slightly smaller than the core. In the latter instance, the rims were heated to provide clearance. Subsequent cooling caused the rims to shrink and apply a limited and uncontrolled pressure to the adhesive and core. The resulting wheels had uneven glue lines, and the rims frequently came off during use with many mils of otherwise usable diamond rim remaining. Introduction of additional hoop strain by expanding the core after mounting the rim minimized the rim stripping problem as shown in United States patent application S.N. 510,972, filed Dec. 1, 1965, by Chester G. Bragaw, Jr. However, the procedure was slow and rather expensive. When a film type adhesive, that is, a cloth support containing a curable adhesive composition, was tried using the technique of thermally expanding the rim followed by fitting the thus expanded rim over the core and film type adhesive followed by curing and cooling to contract the rim to apply pressure to the adhesive, inadequate pressures resulted. Due to these low pressures the adhesive did not flow in the joint, thus giving a poor glue line. Typical values for compressive shear adhesion between the rim and core was in the range of from 2500 to 4900 p.s.i.

SUMMARY OF THE INVENTION

It has now been found that with the clamp and the process of using it of the present invention, abrasive containing rims can be glued to cores rapidly and inexpensively with an improved rim-to-core bond. When a film-type adhesive requiring external pressure during cure is used, the external pressure applied by the clamp of the present invention provides uniform glue lines and excellent bonds in the range of 5400 to 6500 p.s.i. Moreover, rims can be bonded to several cores simultaneously, thus increasing production capability and reducing unit costs of fabrication. In carrying out the present invention the surface of the core which is to be bonded to the rim, which core preferably is a metal such as aluminum, is covered with a film or strip of curable adhesive. The rim which is generally sized to provide about 0.3% interference, as based on the diameter of the core and glue, with the cold core and glue is heated so as to expand it and thus allow it to be slipped over the core and adhesive and the thus formed preassembly is then mounted in the clamp. The clamp is closed and pressured to from 5 to 100 p.s.i. and if required the entire assembly is heated to cure the adhesive. Preferred adhesives are those on a carrier such as a scrim cloth. The scrim cloths generally are made from polyamide or glass fibers, and suitable adhesives include but are not limited to epoxy and phenolic adhesives. While an adhesive which cures at room temperature can be used, adhesives which cure at elevated temperatures generally are preferred because such adhesives generally have superior resistance to the temperatures encountered in grinding.

BRIEF DESCRIPTION OF THE DRAWINGS

FIG. I is a plan view of a rim and core-type grinding wheel mounted in the clamp of the present invention.
FIG. II is a cross-sectional view taken on line 2—2 of FIG. I.
FIG. III is a cross-sectional view of an alternate construction of the clamp.
FIG. IV is a plan view of a test piece removed from a grinding wheel.

In carrying out the present invention, a grinding wheel 1 consisting of a core 2 and a rim 3 is mounted in clamp 4. Clamp 4 consists of main ring 5 and an annular top plate 6 which along with elastomeric pressure ring 7 define pressure cavity 8 which is pressured with fluid through tube 9. Except for pressure ring 7, the clamp parts are most suitably fabricated of metal. Pressure ring 7 is preferably fabricated from a high temperature rubber such as silicone rubber. Ordinarily a gasket or other sealing means (not shown) is provided between main ring 5 and annular top plate 6. Introduction of air or nitrogen or even a liquid such as an oil through pipe 9 applies a pressure to the external surface of the pressure ring 7. The flange design of pressure ring 7 provides a pressure seal between the pressure ring 7 and main ring 5 and top plate 6 permitting a pressure to be transmitted to the ring inside. The pressure ring is readily prepared by concentrically inserting a right cylinder plug the same diameter as the outside of the grinding wheel along with a plug having the same configuration as pressure cavity 8 and casting a rubber in the thus defined cavity.

In FIG. III a one-piece clamp 10 is shown having a generally U-shaped cross-section which faces inwardly and which is adapted to receive within the confines of the U an elastomeric pressure ring 11 which is of U-shaped cross-section wherein the U faces outwardly. Mounted within clamp 10 are two grinding wheels 12 and 13 separated by shim 14. Clamp 10 is equipped with a pipe 15 for pressuring ring 10. Pressure ring 11 is conveniently made by casting a strip of silicone rubber, the cross-section shown, followed by cutting to length and gluing the ends together.

If desired the pressure ring may be made several inches high, in which case an abrasive roll or several abrasive wheels can be fabricated at the same time. The clamp of the present invention finds general utility in joining a ring or sleeve to an inner ring or sleeve.

DESCRIPTION OF THE PREFERRED EMBODIMENTS

For testing the bond strength of the rim to the core a piece of the rim 16 and core 17 cut from a grinding wheel and slits 18 and 19 are cut as shown in FIG. IV. The piece is then mounted in an Instron machine and the fracture stress recorded. The area of the bond being tested is that between the slits and the width of the piece when the ends of the test piece are being pressed together by the machine. In the tests reported herein the test piece was 1⅛ inches long and the slits were 1/16 inch saw cuts ¼ inch apart and the test piece was compressed in the Instron testing machine at the rate of 0.5 inch per minute. In each case the result reported is the average of several test pieces taken from the same wheel.

EXAMPLE 1

The main ring and top plate shown in the drawings are fabricated from 2024 aluminum for making 10″ diameter by ½″ wide wheels. Also fabricated from 2024 aluminum is an annulus having the cross-sectional configuration of the pressure chamber shown in FIG. II and a cylinder having a 10″ outside diameter and a 1″ width which are assembled with the main ring to define a mold cavity. One drop of dibutyl tin dilaurate curing agent (available under the trade name Thermolite-12) per 20 g. of a silicone rubber coating composition (available under the trade name RTV-60) is mixed at ambient temperature in a container which is then placed in a vacuum chamber and the mixture evacuated under a vacuum of over 20 in Hg for about 10 minutes at room temperature. The catalyzed composition is then poured carefully into the mold cavity, avoiding as much as possible the formation of bubbles. The composition is leveled at the top of the annulus and the main ring and allowed to cure over night. The mold is disassembled and the rubber ring removed. It is post cured to remove excess catalyst using a heating cycle of one hour at 50° C., one hour at 100° C., one hour at 200° C., and two hours at 250° C.

The main ring, top plate, and rubber pressure ring are assembled with a silicone rubber gasket between the contacting metal surfaces. The gas inlet in the pressure ring is then connected by copper tubing to a source of air pressure. An assembly for a 10″ x ½″ D1A1 (American Standards Association) abrasive wheel is prepared from a rim ⅛″ thick, ½″ wide and having an outside diameter of 10″ and containing 25 volume percent of 120 grit silicon carbide and 75 volume percent coalesced poly-N,N'-(4,4'-oxydiphenylene)pyromellitimide prepared in accordance with U.S. Pat. No. 3,249,588, an aluminum core ½″ thick and 9¾″ in diameter and a sheet adhesive available commercially under the trade name FM-1000 EP-15 weighing 0.06 lb./ft.² Prior to assembly the rim and core are cleaned by sandblast etching and the core is primed with an adhesive solution available commercially under the trade name BR-1009-49, for use with FM-1000 EP-15. This assembly is placed inside the rubber ring with a thermocouple between the ring and rim. Air under a pressure of 25 p.s.i. is connected to the pressure chamber of the clamp and the whole assembly is placed in an oven maintained at 250° C. until the thermocouple reads between 160 and 165° C. The temperature of the oven is reduced to a temperature of 175+5° C. for one hour. The assembly is removed from the oven, cooled and the pressure released. The abrasive wheel is removed and excess adhesive extruded from between rim and core is removed. The compressive sheer adhesion measured at eight spots around the rim is found to average 5260 p.s.i. with maximum and minimum values of 5950 and 4720 p.s.i.

EXAMPLE 2

A silicone rubber casting composition is poured into a linear mold 4 feet long and a cross-section as shown for the pressure ring in FIG. III. The cured rubber strip is cut to a length corresponding to the wheel circumference and the ends are joined with additional silicone rubber casting composition, using a diagonal lap joint, to produce the ring. The main ring and top plate are fabricated in one piece as shown in FIG. III. The thus formed clamp is employed to glue a rim for a 10 x ½″ wheel, characterized by having a 100 concentration (72 carats/in.³ or 25 volume percent) 170–200 grit synthetic diamonds and being ⅛″ thick, to an aluminum core using FM-1000 EP-15 sheet adhesive (0.06 lb./ft.²). The core and rim were dry etched and the core primed with BR-1009-49 prior to assembly and cure. The compressive sheer adhesion is found to average 4970 p.s.i. with range of 4460–5320 p.s.i.

EXAMPLE 3

Example 2 is repeated except 100–120 grit silicon carbide is substituted for the diamonds and BR-1009-8 primer is used. The compressive sheer adhesion is found to average 5850 p.s.i. with range of 5520–6020 p.s.i.

I claim:

1. A process for bonding cylindrically-shaped articles having an outer annular member adhesively bonded on its inner surface to the outer peripheral surface of an inner member comprising the steps of applying a curable adhesive to at least one of said surfaces to be bonded and contacting said surfaces to form a preassembly, mounting said preassembly in a clamp having an expandable resilient surface such that said expandable resilient surface circumscribes the peripheral surface of said outer annular member, applying from 5 to 100 pounds per square inch pressure to the expandable resilient surface of said clamp whereby to force said expandable resilient surface into firm contact with the peripheral surface of said outer annular member, curing said adhesive to bond said annular member to said inner member to form a bonded composite assembly, releasing said pressure and removing the thus formed composite assembly from said clamp.

2. The process of claim 1 wherein said annular member is a polyimide bonded diamond grinding wheel rim and said inner member is a grinding wheel core.

References Cited

UNITED STATES PATENTS

| | | | |
|---|---|---|---|
| 3,292,503 | 12/1966 | Grobman et al. | 156—285 X |
| 3,433,699 | 3/1969 | Rumble | 156—285 X |

BENJAMIN R. PADGETT, Primary Examiner

S. J. LECHERT, Jr., Assistant Examiner

U.S. Cl. X.R.

156—294, 329, 331